3,468,942
METHOD FOR THE RECOVERY OF HYDROXY
AROMATIC CARBOXYLIC ACIDS
Oscar A. Blum, Upper Saddle River, N.J., assignor to
Tenneco Chemicals, Inc., a corporation of Delaware
No Drawing. Filed Oct. 5, 1966, Ser. No. 584,369
Int. Cl. C07c 65/02, 65/14
U.S. Cl. 260—520                                    16 Claims This invention relates to an improved method for the recovery of hydroxy aromatic carboxylic acids. More particularly, the invention pertains to the recovery of purified hydroxy aromatic carboxylic acids from their alkali metal salts.

A number of processes have been proposed heretofore involving the treatment of alkali metal salts of hydroxy aromatic carboxylic acids to produce the free acids. In general, these processes comprise the addition of a diluted inorganic acid to an aqueous solution of the alkali metal salt of the hydroxy aromatic carboxylic acid to form a thick slurry of the free organic acid. The slurry is then cooled to room temperature, separated to recover the precipitated organic acid, and the precipitated organic acid is washed with water. Hydroxy aromatic carboxylic acids, such as salicyclic acid, prepared by these known procedures have been found to contain comparatively large amounts of ash and inorganic acid contaminants. In addition, the isolated organic carboxylic acid products are characterized by an undesirable color. It would be advantageous therefore to have a hydroxy aromatic carboxylic acid recovery process which would readily reduce the ash and sulfate or halide contents below contaminating levels and at the same time effect an improvement in the color of the organic carboxylic acid product.

The prior art has long recognized that the standard procedures employed for isolating the hydroxy aromatic carboxylic acids from their salts result in products which are not of the highest quality. It has been proposed, for example, to subject the precipitated hydroxy aromatic carboxylic acid to repeated washing with water to obtain a higher degree of purification. Such a procedure, however, is not only time-consuming but also necessarily results in some loss of the desired organic acid product. The use of successive recrystallizations from various organic solvents has also been suggested, but such a procedure substantially increases the costs of recovery due to the additional materials and equipment required. Other methods of purification, such as fractional distillation under reduced pressure, also are costly and troublesome due to the tendency of the organic carboxylic acids to subline or to decompose at elevated temperatures.

One object of the present invention is to provide an improved method for the recovery of hydroxy aromatic carboxylic acids from their alkali metal salts which avoids the disadvantages of and the difficulties encountered with the prior art processes.

Another object of the present invention is to provide an improved method whereby high purity hydroxy aromatic carboxylic acids can readily be isolated from their alkali metal salts.

A further object of the present invention is to provide an improved method for treating alkali metal salts of hydroxy aromatic carboxylic acids to obtain the corresponding free acids with ash and inorganic anion contents reduced below contaminating levels in conjunction with improvement in color.

A still further object of this invention is to provide an improved method for the preparation of purified salicylic acid from sodium salicylate.

These and other objects of the present invention will become readily apparent from the ensuing description and illustrative embodiments.

In accordance with this invention, it has now been found that high purity hydroxy aromatic carboxylic acids can be readily and directly obtained from the alkali metal salts utilizing the conventional procedure outlined above provided that the alkali metal salt or the hydroxy aromatic carboxylic acid is contacted with a surface-active agent during one or more of the processing steps. More specifically, it has been found advantages to add a surface-active agent or surfactant to the aqueous solution of the alkali metal salt of the hydroxy aromatic carboxylic acid prior to the addition of the inorganic acid, to the slurry of hydroxy aromatic carboxylic acid following the cooling step but prior to centrifugation, or to the wash water. In actual operations it was found to be especially advantageous to add the surfactant to the cold organic carboxylic acid slurry prior to the separation of the organic acid precipitate. When the surfactant was added to the aqueous solution of the alkali metal salt feed prior to precipitation, the results were not nearly as good, probably because the surfactant is not stable under the acidic conditions encountered during this processing step. On the other hand, when the surfactant was added to the wash water, again the results were not ideal, probably due to the poor contact between the surfactant and the precipitated free acid. Nevertheless, in each instance significant improvements in acid product quality were attained. In view of these results it is postulated that one of the problems in the prior art methods was the inability to wash properly the hydroxy aromatic carboxylic acid product subsequent to separation. Regardless of the exact theory involved, the practice of the improved method of this invention leads to an important reduction in ash and inorganic anion content along with product color improvement.

The surface-active agents or surfactants useful in the method of this invention include the anionic, cationic, and non-ionic types, especially those which are further characterized as being useful as wetting agents. Anionic types of wetting agents include alkali metal salts of compounds containing hydrophilic groups, such as sulfonated paraffinic hydrocarbons, sulfonated aromatic hydrocarbons, sulfonated alkyl aryl hydrocarbons, sulfonated natural fatty materials, sulfonated fatty alcohols, and sulfonated fatty acid esters, fatty acid esters, fatty acid amines, or amino acids; alkali metal salts of sulfuric acid esters of fatty alcohols; alkali metal salts of phosphoric acid esters of fatty alcohols; and alkali metal salts of products obtained by the saponification of fats. Examples of suitable anionic agents include sodium oleate, sodium stearate, potassium oleate, potassium lauryl sulfate, sodium alkyl naphthalene sulfonate, sodium dibutyl naphthalene sulfonate, sodium dodecyl benzene sulfonate, sodium decyl benzene sulfonate, sodium dibutyl phenylphenol disulfonate, sodium and potassium dioctyl succinyl sulfonate, sodium isopropyl naphthalene sulfonate, and the like as well as mixtures thereof.

Suitable cationic wetting agents include quaternary ammonium salts or salts of high alkylamines, such as lauryl trimethyl ammonium chloride, octadecyl trimethyl ammonium chloride, cetyl dimethyl benzyl ammonium chloride, cetyl trimethyl ammonium bromide, stearyl dimethyl amine oxide, and the like as well as mixtures thereof.

Nonionic types of wetting agents may be condensation products of fatty materials and their derivatives with ethylene oxide, condensation products of substituted phenols with ethylene oxide, and condensation products of sorbitan and sorbitan esters with ethylene oxide. Such agents include, for example, polyethylene glycol fatty acid esters such as the distearates; polyethylene glycol alkyl ethers such as polyethylene glycol lauryl ether; polyethylene esters of fatty acids of rosin acids; sorbitan condensates such as tris (polyoxyethylene) sorbitan monolaurate and monooleate; and the like as well as mixtures thereof.

In most cases, a dilute aqueous solution of the surfactant is used to treat the organic acid or salt. The amount of surfactant employed is in the range of about 5 to 100 p.p.m., and preferably about 10 to 20 p.p.m., based on the sodium salicylate content. It will be understood, however, that the exact amount of surfactant employed is not critical and that only an amount sufficient to effect improved washing of the precipitated organic acid need be utilized.

The alkali metal salts of hydroxy aromatic carboxylic acids are preferably the sodium or potassium salts of salicylic acid, p-hydroxybenzoic acid, or β-oxynaphthoic acid. It will be understood, however, that these compounds include carboxylic acids derived from both monocyclic and polycyclic phenols wherein one or more of the hydrogen atoms attached to the aromatic nucleus may be substituted by hydrocarbon radicals, halogen atoms, amino groups, nitro groups, or ether groups, for example, phenol, cresol, α-naphthol, β-naphthol, 2-tertiary butyl-4-methylphenol, hydroxydiphenyl, hydroquinone, anthranol, chlorophenol, hexadecylphenol, and 2,5-dinonylphenol. In general, the alkali metal salts of the hydroxy aromatic carboxylic acids are utilized in the form of aqueous solutions wherein the concentration of the salt may vary within the range of about 10% to 40%, preferably about 15% to 20% by weight. Although sodium or potassium salts of the hydroxy aromatic carboxylic acids are the preferred feed materials, other alkali metal salts of such compounds can be effectively employed.

As previously discussed, the aqueous solution of the alkali metal salt is initially contacted with a mineral acid to obtain a slurry or precipitate of the hydroxy aromatic carboxylic acid. This mixture is then cooled to room temperature and subjected to a conventional separation procedure to isolate the solid organic acid, which is then washed with water to recover the hydroxy aromatic carboxylic acid product.

The preferred mineral acids are sulfuric acid and hydrochloric acid. They are usually employed in dilute solutions having an acid concentration range from about 10% to 100%. In general, an excess of acid is employed and the resulting acidified reaction product solution has a pH of from about 1.2 to 5.5, and preferably from about 1.8 to 2. The acidified reaction mixture containing the freed hydroxy aromatic carboxylic acid in the form of thick slurry is then cooled to room temperature by use of conventional cooling means or merely by permitting it to remain undisturbed for a sufficient period of time.

The cooled mixture is subsequently treated to separate the precipitated organic acid therefrom. Conventional separation equipment, for example, centrifuges, Nutsche filters, plate and frame presses, rotary vacuum filters, and the like or combinations thereof may be used. In the final step, the separated organic acid is washed with water under ambient conditions to effect a final purification treatment.

As noted above, the improved method of this invention comprises contacting the hydroxy aromatic carboxylic acid or the alkali metal salt starting material with a minor amount of a surfactant, particularly one that is classified as being a wetting agent. In accordance with the preferred method of operation, the wetting agent is added to the organic acid slurry following the cooling step but prior to the step of separation. The invention will be hereinafter described more specifically in terms of this particular disclosure, although it will be understood that the wetting agent may also be added to the alkali metal salt starting material prior to acidification or to the wash water in the final purification step. It is another feature of this invention that the wetting agent is added with agitation to ensure intimate contact with the hydroxy aromatic carboxylic acid or its alkali metal salt. The agitation may be readily accomplished by the use of such equipment as stirrers, mixers, and the like. The use of agitation is, however, not a critical feature of the present invention and may be omitted, if desired.

Numerous advantages are achieved by the practice of the improved method of this invention. The amount of ash and inorganic anion is significantly reduced without the need to employ special equipment, solvents, etc. as proposed in the prior art processes, and an improvement in the solor of the hydroxy aromatic carboxylic acid is achieved in conjunction with the aforementioned reduction in ash and sulfate or halide in ion contaminants. Since the improved method of this invention does not require repeated washings of the precipitated hydroxy aromatic carboxylic acids, improved yields are also attained. Other advantages include uniform product quality due to the more complete washings obtained for each batch of the hydroxy aromatic carboxylic acid.

The invention will be more fully understood by reference to the following illustrative embodiments directed to the recovery of salicylic acid from sodium salicylate solutions.

Example 1

An aqueous solution containing 15% by weight of sodium salicylate at a temperature of 75° C. was contacted with an amount of a dilute solution of sulfuric acid sufficient to bring its pH to 2.0. When the resulting reaction mixture had been cooled to room temperature (22° C.), 10 p.p.m. of sodium dioctyl succinyl sulfonate was added to it. The slurry which was agitated during the addition of the wetting agent was then centrifuged to separate the solid salicylic acid produce which was then washed with water and dried.

Table A contains product analyses which compare the salicylic acid produced by the above-described process with salicylic acid prepared in exactly the same manner but in the absence of the wetting agent.

TABLE A

|  | Without Wetting Agent | With 10 p.p.m. Wetting Agent |
|---|---|---|
| APHA Color Rating | 20 | 4 |
| Ash, percent | 0.17 | 0.03 |
| Sulphate, p.p.m | 500 | 50 |

APHA colors are based on standards established by the American Public Health Association and are described in the publication "Standard Methods for the Examination of Water and Sewage," 8th edition, page 13 (1936). The colors reported in this application are those of 2% solutions of the acid in methanol.

Example 2

Sodium salicylate aqueous solutions (500 g.) containing approximately 15% by weight of sodium salicylate were treated in a series of runs with an amount of a 50% sulfuric acid solution sufficient to obtain a pH of 1.5–2.0. The resulting slurry was cooled to room temperature and sodium dioctyl succinyl sulfonate added to it. The slurry was agitated during the 5-minute addition period. The slurry was then centrifuged and the separated salicylic acid was washed with water at room temperature and then dried.

The amounts of wetting agents used in the runs and the analysis of the resulting salicylic acid are given in Table B.

TABLE B

| Ex. No. | Wetting Agent, p.p.m. | APHA Color Rating | Ash, percent | Sulphate, p.p.m. |
|---|---|---|---|---|
| 2–1 | None | 18 | 0.24 | 400 |
| 2–2 | 60 | 15 | 0.04 | 60 |
| 2–3 | 20 | 16 | 0.04 | 60 |
| 2–4 | 10 | 15 | 0.04 | 60 |

Example 3

To 1500 grams of a 15% sodium salicylate solution at 75° C. was added 10 cc. of a 3.75% sodium isopropyl naphthalene sulfonate solution. Sulfuric acid was then added to the solution to reduce its pH to 2.0. The resulting slurry was cooled to room temperature and centrifuged to separate the precipitated salicylic acid. The acid cake was washed with water and then divided into two equal portions.

One salicylic acid portion, after being dried, had an APHA color rating of 105 and an ash content of 0.11%. By way of comparison, salicylic acid obtained by the same procedure but in the absence of the wetting agent had an APHA color rating of 140 and an ash content of 0.33%.

The other portion of the salicylic acid was treated at room temperature with water that contained sodium dioctyl succinyl sulfonate and then dried. The product had an APHA color rating of 130 and an ash content of 0.066%.

The above data show that when the hydroxy aromatic carboxylic acid is recovered from its alkali metal salt utilizing the known procedure but in the presence of a surfactant or wetting agent, the resulting hydroxy aromatic carboxylic acid product has a markedly improved quality. Furthermore, the data reveal that the surfactant should preferably be added following the acidification of the aqueous solution of the alkali metal salt feed material and after it has been cooled to room temperature but prior to the step of separating the precipitated hydroxy aromatic carboxylic acid from the mother liquor.

While particular embodiments of this invention are shown above, it will be understood that the improved method of recovering hydroxy aromatic carboxylic acid may be subjected to variations and modifications without departing from its broader aspects.

What is claimed is:

1. In the method for the recovery of hydroxy aromatic carboxylic acids from their alkali metal salts by sequentially adding a mineral acid to an aqueous solution of an alkali metal salt of a hydroxy aromatic carboxylic acid to obtain the free organic acid, cooling the resulting mixture, separating the precipitated carboxylic acid therefrom, and then washing said separated acid with water, the improvement which comprises conducting at least one of said sequential steps in the presence of a minor amount of a wetting agent.

2. The method of claim 1 wherein said hydroxy aromatic carboxylic acid is salicylic acid.

3. The method of claim 1 wherein said hydroxy aromatic acid is para-hydroxybenzoic acid.

4. The method of claim 1 wherein said hydroxy aromatic acid is $\beta$-oxynaphthoic acid.

5. The method of claim 1 wherein said wetting agent is an alkali metal salt of a sulfonated hydrocarbon.

6. The method of claim 5 wherein said wetting agent is sodium dioctyl succinyl sulfonate.

7. The method of claim 1 wherein said wetting agent is sodium isopropyl naphthalene sulfonate.

8. The method of claim 1 wherein said wetting agent is added to the aqueous solution of the alkali metal salt of the hydroxy aromatic carboxylic acid prior to the addition of the mineral acid.

9. The method of claim I wherein said wetting agent is added to the cooled mixture containing the precipitated carboxylic acid prior to the separation of the precipitated carboxylic acid therefrom.

10. In the method for the recovery of salicylic acid by sequentially acidifying an aqueous solution of an alkali metal salt of salicylic acid with a mineral acid, cooling the resulting reaction product mixture, separating precipitated salicylic acid from the cooled aqueous slurry, and washing said separated salicylic acid with water, the improvement which comprises contacting said salicylic acid or its alkali metal salt at least once during said sequential recovery method with a minor amount of a wetting agent.

11. The method of claim 10 wherein said alkali metal salt of salicylic acid is sodium salicylate.

12. The method of claim 10 wherein said mineral acid is sulfuric acid.

13. The method of claim 10 wherein a minor amount of said wetting agent is added to the cooled aqueous slurry prior to separation.

14. The method of claim 10 wherein said wetting agent is an alkali metal salt of a sulfonated hydrocarbon.

15. The method of claim 10 wherein said wetting agent is sodium dioctyl succinyl sulfonate.

16. The method of claim 10 wherein said wetting agent is sodium isopropyl naphthalene sulfonate.

References Cited

Wertheim, Organic Chemistry, 3d ed., Blakiston, 1951, p. 563.

LORRAINE A. WEINBERGER, Primary Examiner

D. STENZEL, Assistant Examiner

U.S. Cl. X.R.

260—521